(12) United States Patent
Ortmann et al.

(10) Patent No.: US 9,168,825 B2
(45) Date of Patent: *Oct. 27, 2015

(54) HYBRID ELECTRIC VEHICLE AND METHOD FOR CONTROLLING A POWERTRAIN THEREIN

(75) Inventors: Walter Joseph Ortmann, Saline, MI (US); Daniel Scott Colvin, Farmington Hills, MI (US); Marvin Paul Kraska, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1652 days.

This patent is subject to a terminal disclaimer.

(21) Appl. No.: 12/466,471

(22) Filed: May 15, 2009

(65) Prior Publication Data

US 2010/0292901 A1 Nov. 18, 2010

(51) Int. Cl.
| | |
|---|---|
| *G06F 7/00* | (2006.01) |
| *G06F 17/00* | (2006.01) |
| *G06F 19/00* | (2011.01) |
| *B60K 6/442* | (2007.10) |

(Continued)

(52) U.S. Cl.
CPC ................ *B60K 6/442* (2013.01); *B60K 6/365* (2013.01); *B60K 6/485* (2013.01); *B60K 6/52* (2013.01); *B60K 6/547* (2013.01); *B60W 10/08* (2013.01); *B60W 10/115* (2013.01); *F16H 7/10* (2013.01); *B60L 7/10* (2013.01); *B60L 7/12* (2013.01); *B60L 7/14* (2013.01); *B60L 7/16* (2013.01); *B60L 7/18* (2013.01); *B60L 7/20* (2013.01); *B60L 7/22* (2013.01); *B60L 2240/423* (2013.01); *B60L 2240/441* (2013.01); *B60W 20/00* (2013.01); *B60W 2510/0638* (2013.01); *B60W 2520/10* (2013.01); *B60W 2710/083* (2013.01); *F16H 2061/0422* (2013.01); *Y02T 10/6226* (2013.01); *Y02T 10/6234* (2013.01); *Y02T 10/6265* (2013.01); *Y02T 10/642* (2013.01)

(58) Field of Classification Search
CPC ..... B60W 10/02; B60W 10/06; B60W 10/08; B60W 20/00; B60W 30/18; B60K 6/48; B60K 6/445; B60K 2741/145; F16H 61/66; F16H 61/66259; F16H 61/0213; F16H 61/143; F16D 48/06; F16D 48/066; F16D 2500/3026; Y02T 10/6221; Y02T 10/6286
USPC ................................. 477/1–5; 701/61, 67, 68
See application file for complete search history.

(56) References Cited

U.S. PATENT DOCUMENTS 4,855,914 A * 8/1989 Davis et al. ..................... 701/60
5,351,795 A 10/1994 Dadel et al.

(Continued)

FOREIGN PATENT DOCUMENTS

CN 101011931 A 8/2014

OTHER PUBLICATIONS

English Translation of CN101011931A from Google, Jan. 26, 2015.*

*Primary Examiner* — Jeffrey Shapiro
(74) *Attorney, Agent, or Firm* — Brooks Kushman P.C.; David B. Kelley

(57) ABSTRACT

A method for controlling a hybrid electric powertrain includes, in response to a request to increase a powertrain braking force on at least one of a plurality of traction wheels, (i) commanding at least one clutch to increase a gear ratio of a transmission, and (ii) during clutch stroke, commanding an electric machine to act as a generator such that the electric machine applies a braking force to at least one of the traction wheels.

12 Claims, 3 Drawing Sheets

(51) Int. Cl.

| | | |
|---|---|---|
| *F16H 7/10* | (2006.01) | |
| *B60K 6/365* | (2007.10) | |
| *B60K 6/485* | (2007.10) | |
| *B60K 6/52* | (2007.10) | |
| *B60K 6/547* | (2007.10) | |
| *B60W 10/08* | (2006.01) | |
| *B60W 10/115* | (2012.01) | |
| *F16H 61/04* | (2006.01) | |
| *B60L 7/22* | (2006.01) | |
| *B60L 7/20* | (2006.01) | |
| *B60L 7/18* | (2006.01) | |
| *B60L 7/16* | (2006.01) | |
| *B60L 7/14* | (2006.01) | |
| *B60L 7/12* | (2006.01) | |
| *B60L 7/10* | (2006.01) | |
| *B60W 20/00* | (2006.01) | |

(56) References Cited

U.S. PATENT DOCUMENTS

| | | | | |
|---|---|---|---|---|
| 5,713,425 | A * | 2/1998 | Buschhaus et al. | 180/65.25 |
| 5,934,395 | A | 8/1999 | Koide et al. | |
| 5,993,350 | A | 11/1999 | Lawrie et al. | |
| 6,019,699 | A | 2/2000 | Hoshiya et al. | |
| 6,272,414 | B1 * | 8/2001 | Takahashi et al. | 701/54 |
| 6,278,915 | B1 * | 8/2001 | Deguchi et al. | 701/22 |
| 6,332,257 | B1 | 12/2001 | Reed, Jr. et al. | |
| 6,334,498 | B1 * | 1/2002 | Morisawa et al. | 180/65.25 |
| 6,359,404 | B1 * | 3/2002 | Sugiyama et al. | 318/432 |
| 6,371,878 | B1 | 4/2002 | Bowen | |
| 6,600,980 | B1 | 7/2003 | Kraska et al. | |
| 6,775,601 | B2 * | 8/2004 | MacBain | 701/22 |
| 6,827,167 | B2 * | 12/2004 | Cikanek et al. | 180/65.6 |
| 6,835,160 | B2 * | 12/2004 | Kitano et al. | 477/5 |
| 6,875,154 | B2 | 4/2005 | Mitsutani et al. | |
| 6,890,283 | B2 * | 5/2005 | Aoki | 477/5 |
| 6,935,295 | B2 | 8/2005 | Marriott | |
| 6,941,830 | B2 * | 9/2005 | Ibamoto et al. | 74/339 |
| 6,994,360 | B2 * | 2/2006 | Kuang et al. | 180/65.235 |
| 7,071,642 | B2 * | 7/2006 | Wilton et al. | 318/268 |
| 7,086,301 | B2 * | 8/2006 | Sakamoto et al. | 74/335 |
| 7,137,924 | B2 | 11/2006 | Ito et al. | |
| 7,223,201 | B2 | 5/2007 | Colvin et al. | |
| 7,347,803 | B2 | 3/2008 | Kobayashi et al. | |
| 7,395,889 | B2 * | 7/2008 | Sugiyama et al. | 180/65.285 |
| 7,578,364 | B2 * | 8/2009 | Ohno | 180/65.28 |
| 7,588,513 | B2 * | 9/2009 | Yang | 477/3 |
| 7,611,433 | B2 * | 11/2009 | Forsyth | 475/5 |
| 8,091,659 | B2 * | 1/2012 | Luo et al. | 180/65.22 |
| 8,162,084 | B2 * | 4/2012 | Iwanaka et al. | 180/65.235 |
| 2001/0023666 | A1 * | 9/2001 | Suzuki | 123/2 |
| 2002/0116099 | A1 * | 8/2002 | Tabata et al. | 701/22 |
| 2003/0042054 | A1 * | 3/2003 | Matsubara et al. | 180/65.2 |
| 2003/0085062 | A1 * | 5/2003 | Bowen | 180/65.1 |
| 2003/0085577 | A1 * | 5/2003 | Takaoka et al. | 290/40 C |
| 2003/0183431 | A1 * | 10/2003 | Cikanek et al. | 180/65.6 |
| 2003/0184152 | A1 * | 10/2003 | Cikanek et al. | 303/152 |
| 2005/0103551 | A1 * | 5/2005 | Matsuno | 180/243 |
| 2005/0109549 | A1 * | 5/2005 | Morrow | 180/65.2 |
| 2006/0011395 | A1 * | 1/2006 | Sugiyama et al. | 180/65.4 |
| 2006/0048516 | A1 * | 3/2006 | Tenbrock et al. | 60/698 |
| 2006/0064225 | A1 * | 3/2006 | Tabata et al. | 701/96 |
| 2006/0185637 | A1 | 8/2006 | Mitsuhori et al. | |
| 2006/0254564 | A1 | 11/2006 | Lewis et al. | |
| 2006/0272869 | A1 * | 12/2006 | Hidaka et al. | 180/65.2 |
| 2006/0293144 | A1 * | 12/2006 | Nishina et al. | 477/5 |
| 2007/0056783 | A1 * | 3/2007 | Joe et al. | 180/65.2 |
| 2007/0102208 | A1 * | 5/2007 | Okuda et al. | 180/65.3 |
| 2007/0162200 | A1 | 7/2007 | Zillmer et al. | |
| 2007/0173372 | A1 * | 7/2007 | Ueno | 477/3 |
| 2007/0199745 | A1 * | 8/2007 | Hayashi | 180/65.2 |
| 2007/0205036 | A1 * | 9/2007 | Ogata et al. | 180/337 |
| 2007/0205735 | A1 * | 9/2007 | Kiuchi et al. | 318/432 |
| 2007/0227790 | A1 * | 10/2007 | Tanishima | 180/65.2 |
| 2007/0233357 | A1 | 10/2007 | Sugai et al. | |
| 2008/0078593 | A1 | 4/2008 | Ortmann et al. | |
| 2009/0095549 | A1 * | 4/2009 | Dalum et al. | 180/65.265 |
| 2009/0143950 | A1 * | 6/2009 | Hasegawa et al. | 701/68 |
| 2013/0296100 | A1 * | 11/2013 | Nefcy et al. | 477/4 |

\* cited by examiner

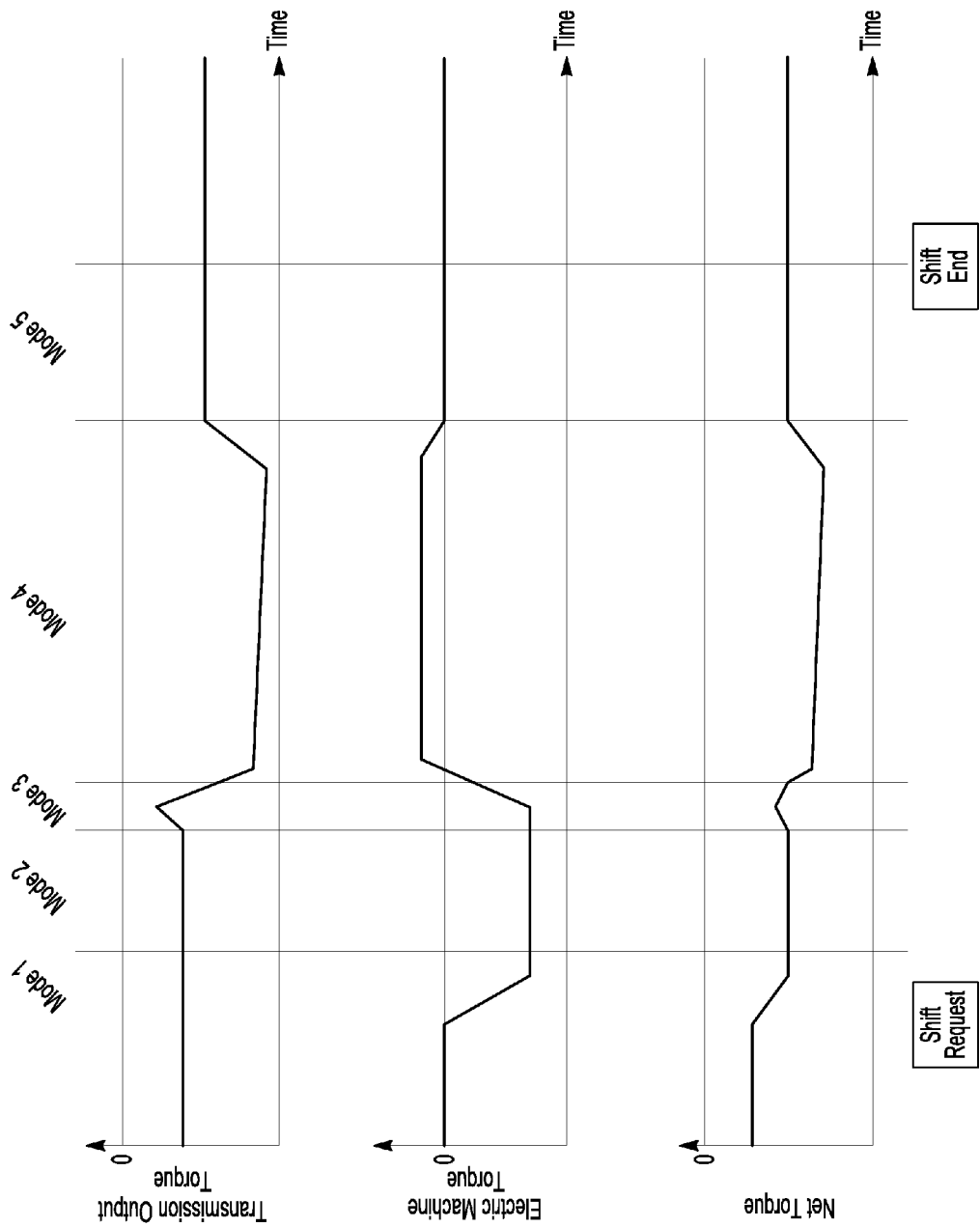

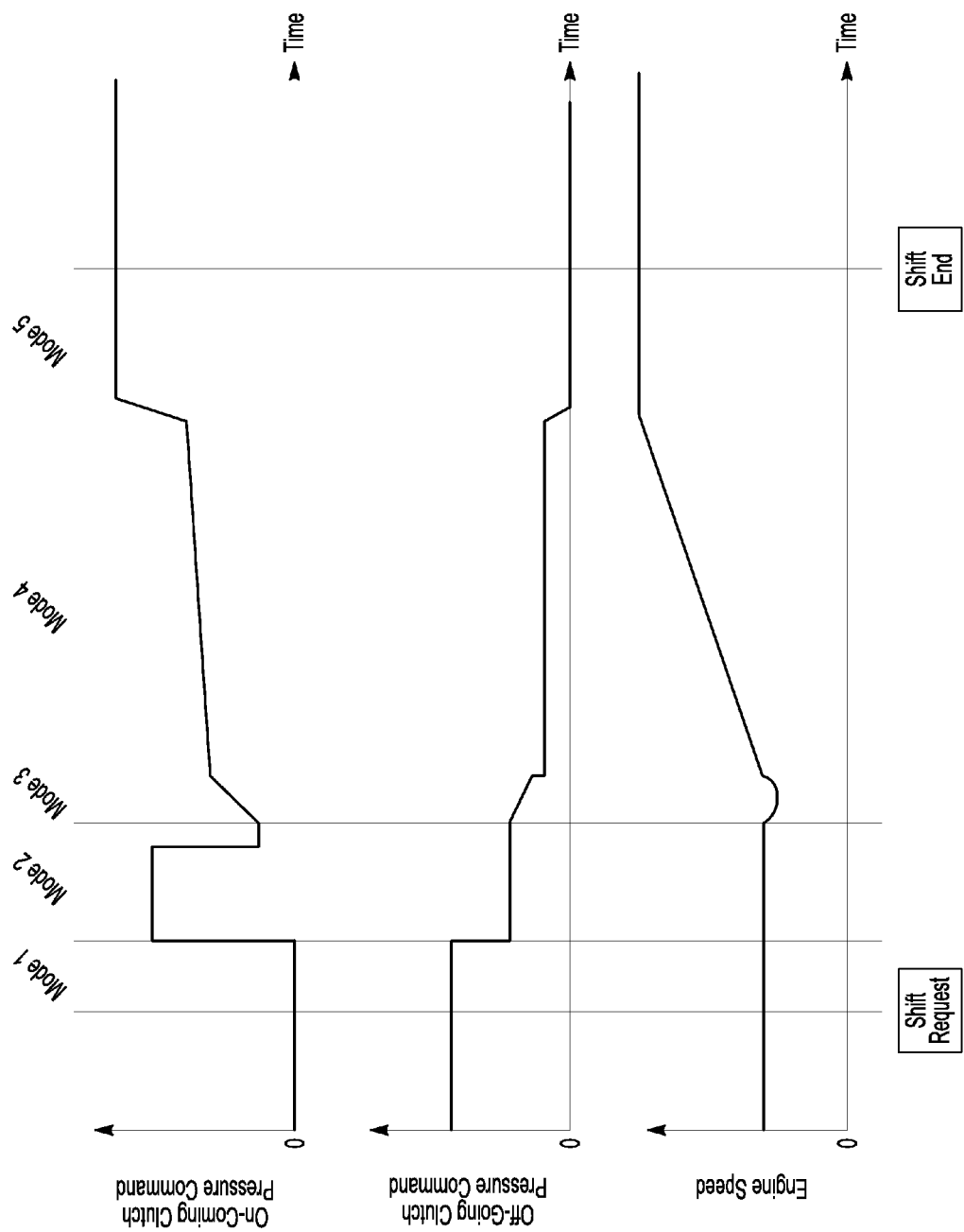

HYBRID ELECTRIC VEHICLE AND METHOD FOR CONTROLLING A POWERTRAIN THEREIN

BACKGROUND

U.S. Pat. No. 5,993,350 to Lawrie et al. provides a powertrain system for a hybrid vehicle. The hybrid vehicle includes a heat engine, such as a diesel engine, and an electric machine, which operates as both an electric motor and an alternator, to power the vehicle. The hybrid vehicle also includes a manual-style transmission configured to operate as an automatic transmission from the perspective of the driver. The engine and the electric machine drive an input shaft which in turn drives an output shaft of the transmission. In addition to driving the transmission, the electric machine regulates the speed of the input shaft in order to synchronize the input shaft during either an upshift or downshift of the transmission by either decreasing or increasing the speed of the input shaft. Operation of the transmission is controlled by a transmission controller which receives input signals and generates output signals to control shift and clutch motors to effect smooth launch, upshifts, and downshifts of the transmission.

U.S. Pat. No. 6,019,699 to Hoshiya et al. provides a drive control system for a hybrid vehicle that prevents a delay in the application of a one-way clutch in a transmission. In this drive control system, an electric motor and an internal combustion engine are coupled to the input side of a transmission having at least one gear stage to be set by applying a one-way clutch. The drive control system comprises: a detector for detecting a coasting state in which the one-way clutch is released in a deceleration state set with the gear stage; and, an input speed raising device for driving the electric motor when the coasting state is detected, so that the input speed of the transmission may approach the synchronous speed which is the product of the gear ratio of the gear stage to be set by applying the one-way clutch and the output speed of the transmission.

SUMMARY

A method for controlling a hybrid electric powertrain includes, in response to a request to increase a powertrain braking force on at least one of a plurality of traction wheels, (i) commanding at least one clutch to increase a gear ratio of a transmission, and (ii) during clutch stroke, commanding an electric machine to act as a generator such that the electric machine applies a braking force to at least one of the traction wheels.

A hybrid electric vehicle includes a plurality of traction wheels, an engine, and a transmission mechanically connected with the engine and including at least one clutch to alter a gear ratio of the transmission. The vehicle also includes an electric machine mechanically connected with at least one of the traction wheels, and a controller. The controller is configured to, in response to a request to increase a powertrain braking force on at least one of the traction wheels, (i) command the at least one clutch to increase the gear ratio of the transmission and (ii) during clutch stroke, command the electric machine to act as a generator such that the electric machine applies a braking force to at least one of the traction wheels.

A hybrid electric vehicle includes a plurality of traction wheels, an engine, and a transmission mechanically connected with the engine and including at least one clutch to alter a gear ratio of the transmission. The vehicle also includes an electric machine mechanically connected with at least one of the traction wheels, a power storage unit, and a controller. The controller is configured to, in response to a request to increase a braking force on at least one of the traction wheels, (i) command the electric machine to act as a generator such that the electric machine applies a braking force to at least one of the traction wheels until a state of charge of the power storage unit achieves a desired threshold, and (ii) command the at least one clutch to increase the gear ratio of the transmission after the state of charge of the power storage unit achieves the desired threshold.

While example embodiments in accordance with the invention are illustrated and disclosed, such disclosure should not be construed to limit the invention. It is anticipated that various modifications and alternative designs may be made without departing from the scope of the invention.

BRIEF DESCRIPTION OF THE DRAWINGS

FIG. 3 is an example plot of transmission output torque generated in response to a request for a manual pull-in down shift.

FIG. 4 is an example plot of electric machine torque generated in response to a request for a manual pull-in down shift.

FIG. 5 is an example plot of net electric machine and transmission output torque generated in response to a request for a manual pull-in down shift.

FIG. 6 is an example plot of on-coming transmission clutch pressure command generated in response to a request for a manual pull-in down shift.

FIG. 7 is an example plot of off-going transmission clutch pressure command generated in response to a request for a manual pull-in down shift.

FIG. 8 is an example plot of engine speed during a manual pull-in down shift.

DETAILED DESCRIPTION

A driver of a hybrid electric vehicle may execute a manual pull-in downshift when, for example, travelling down a steep grade to achieve additional deceleration and minimize brake wear. The transmission may be downshifted into a lower gear via synchronous clutches or a coast clutch such that negative torque (braking torque) is transmitted to the driveline.

A delay in achieving the desired negative driveline torque during a manual pull-in may occur in hybrid electric drivetrains (and other drivetrain configurations). This delay can be up to one second as measured from the driver command or PRNDL position movement until torque increases in the halfshafts. Delay may result from the need to stroke the oncoming transmission clutch. Delay may also result from the need to ensure that the engine does not exceed its speed limit if the transmission is downshifted. The drivetrain may wait until the vehicle speed is reduced so that when the transmission is downshifted, the engine speed will not exceed its limit.

Certain embodiments disclosed herein may reduce/eliminate delays in achieving a desired negative driveline torque after the initiation of a request for a manual pull-in. As an example, an electric machine may be requested to provide negative driveline torque while a mechanical driveline is requested to perform a manual pull-in (e.g., stroke the oncoming clutch, bring the engine up to synchronous speed and transfer torque to the new ratio), provided the engine speed is less than a desired threshold for the desired gear. If the engine speed is greater than the desired threshold, the request to shift may be delayed until the engine speed is less than the desired threshold. Once the new gear is available, electric torque may be reduced as the mechanical torque is increased to provide generally consistent vehicle deceleration.

As another example, the electric machine may be requested to provide negative driveline torque (possibly while the mechanical driveline remains off) until an associated battery reaches a desired state of charge. (As apparent to those of ordinary skill, the electric machine acts as a generator while providing negative driveline torque. Electrical energy generated by the electric machine may be stored in the battery.) The mechanical driveline may then be requested to perform a manual pull-in, and electric torque reduced and mechanical torque increased as described herein.

Figure 1:
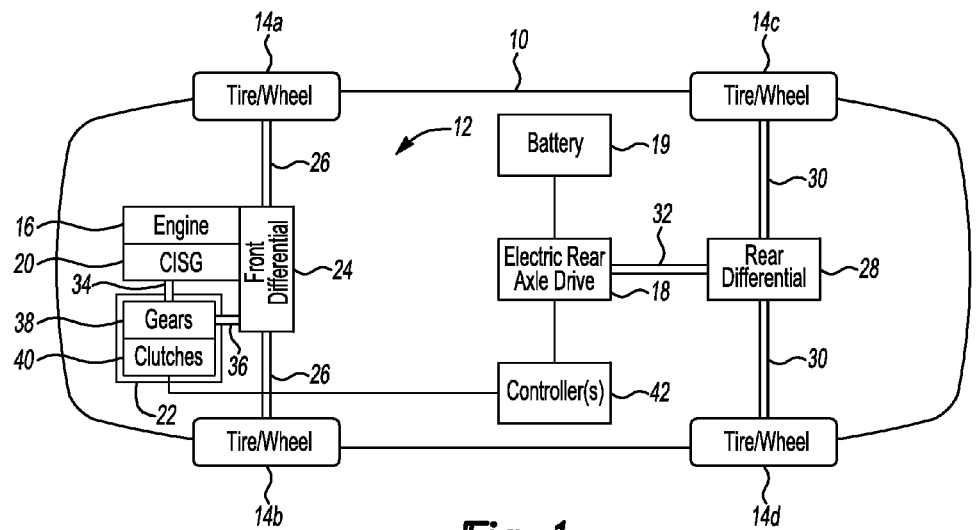
FIG. 1 is a block diagram of an example configuration of a hybrid electric vehicle.

Referring now to FIG. 1, an automotive vehicle 10 may include a drivetrain 12. The drivetrain 12 may include tire/wheel assemblies 14n (14a, 14b, 14c, 14d), an engine 16, electric machine 18 (e.g., electric rear axle drive), and power storage unit 19 (e.g., battery). The drivetrain 12 may also include a crank integrated starter/generator (CISG or other electric machine) 20, transmission 22, front differential 24, and front half shafts 26. As apparent to those of ordinary skill, components immediately adjacent to each other are mechanically connected. The drivetrain 12 may further include a rear differential 28, rear half shafts 30, and a rear prop shaft 32.

The transmission 22 may include an input 34 mechanically connected with the engine 16, an output 36 mechanically connected with the tire/wheel assemblies 14a, 14b via the front differential 24, one or more gears 38, and one or more clutches 40 arranged in a known fashion.

As known in the art, the CISG 20 may be used to start or stop the engine 16; the engine may generate motive power to drive the tire/wheel assemblies 14a, 14b via the transmission 22, front differential 24, and front half shafts 26. As also known in the art, the electric machine 18 may act as a motor to generate motive power to drive the tire wheel assemblies 14c, 14d via the rear prop shaft 32, rear differential 28, and rear half shafts 30; the electric machine 18 may also act as a generator to generate electrical power for storage by the power storage unit 19. Either or both of the engine 16 and electric machine 18 may be used to generate motive power to drive the tire/wheel assemblies 14n.

One or more controllers 42 may be in communication with the electric machine and/or transmission 22. The controllers 42 may submit torque commands/requests to the electric machine 18 such that, for example, the electric machine consumes electrical power to generate a propulsion force for the tire/wheel assemblies 14c, 14d, or consumes mechanical power to generate a braking force (negative torque) for the tire/wheel assemblies 14c, 14d. The controllers 42 may submit commands/requests to the transmission 22 such that, for example, a speed ratio of the transmission 22 (e.g., the ratio of the speed of the input 34 to the speed of the output 36) changes via application of the clutches 40 to the gears 38 in a known fashion. As discussed below, these commands may be coordinated to provide negative driveline torque in response to a request for a manual pull-in downshift with little or no delay.

Figure 2:
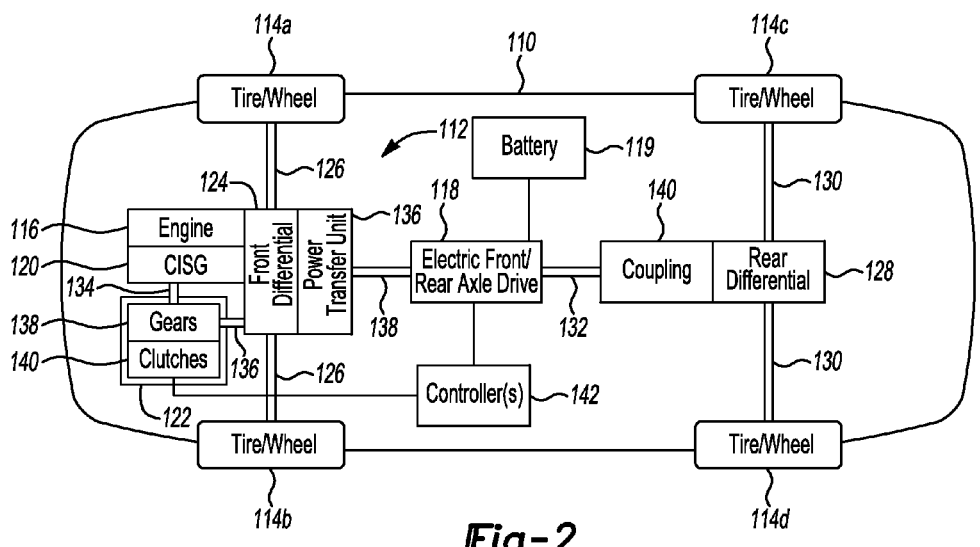
FIG. 2 is a block diagram of another example configuration of a hybrid electric vehicle.

Referring now to FIG. 2, numbered elements that differ by 100 relative to FIG. 1 have similar descriptions to the numbered elements of FIG. 1. The drivetrain 112 of FIG. 2 includes a power transfer unit 136, front prop shaft 138, and a coupling 140. As known in the art, these additional components may (i) permit the engine 116 to drive any of the tire/wheel assemblies 114n and (ii) permit the electric machine 118 to drive any of the tire/wheel assemblies 114n. Of course, other drivetrain configurations are also possible.

Referring now to FIGS. 3 through 8, the operation of an engine, electric machine, transmission clutches, and controllers (such as the engines 16, 116, electric machines 18, 118, clutches 40, 140, and controllers 42, 142 illustrated in FIGS. 1 and 2) are described with reference to several operating modes that occur in response to a request for a manual pull-in downshift. While there are five such operating modes in the embodiments of FIGS. 3 through 8, any suitable number of operating modes may be used.

FIG. 3 depicts conventional transmission output torque to a driveline during a manual pull-in downshift. That is, transmission output torque first overshoots (after some delay) and then undershoots its final target value. With the addition of offsetting electric machine torque to the driveline as depicted in FIG. 4, the net torque output of the electric machine and transmission to the driveline as depicted in FIG. 5 has reduced overshoot and undershoot, as well as reduced delay.

Mode 1: The strategy enters Mode 1 at the initiation of a manual pull-in downshift request. A controller may command an electric machine to provide negative torque (i.e., act as a generator). This torque may continue to ramp to a calibrateable value of maximum torque, which may be a function of vehicle speed.

The strategy may exit Mode 1 after the controller receives notification that a transmission is ready to downshift (increase its gear ratio) via, for example, a shift ready flag or any other known technique. If the engine speed is such that it will not exceed its limit when downshifted, this may occur immediately. If the engine speed is such that it will exceed its limit when downshifted, the strategy may wait until the engine speed decreases to a suitable value before the shift ready flag is set. In other embodiments, the shift ready flag may be set when a state of charge of a power storage unit achieves a threshold value (assuming engine speed, if the engine is on, is such that it will not exceed its limit when downshifted).

Mode 2: The electric machine torque command initiated in Mode 1 may continue (e.g., ramp until a calibrateable value is achieved, and then hold), if it has not already achieved the calibrateable value during Mode 1. The controller may command an on-coming transmission clutch pressure to a high value to fill the clutch then cut back to a calibrateable value needed to start the shift as known in the art. The controller may command an off-going transmission clutch pressure to a reduced calibrateable value as also known in the art.

The strategy may exit Mode 2 at the expiration of a timer, detection of the torque phase, and/or detection of the shift start in a known fashion.

Mode 3: The controller commands the on-coming transmission clutch pressure to increase and the off-going transmission clutch pressure to decrease in a coordinated manner as known in the art. The controller holds the electric machine torque at its current commanded value until a drop in engine speed (which corresponds to a peak in transmission output torque) is detected. (As known in the art, the described coordinated activity of the on-coming and off-going clutches causes a dip in engine speed if this coordination is biased towards a flare condition. If this coordination is biased towards a tie-up condition, the engine speed will, of course, rise and the transmission output torque will become more negative.) The controller may then command the electric machine to provide positive torque (i.e., act as a motor). (Alternatively, this command may be initiated after the strategy exits Mode 3.) This torque may continue to ramp to a calibrateable value of maximum torque, which may be a function of vehicle speed The strategy may exit Mode 3 when a speed ratio of the transmission has achieved a desired value, e.g., 5% of the final value.

Mode 4: The controller may control the on-coming clutch through, for example, an open or closed loop profile, and command the off-going clutch to a pressure below its stroke pressure. The controller may command the electric machine back to, for example, zero torque (or other target value) as a function of percent shift complete. Commanding the electric machine torque to offset the inertia torque of the input to the transmission may provide a smoother shift. Keeping the electric machine torque at zero (or negative torque) may provide an elevated negative torque feel that may be desired when a manual pull-in shift is requested. Thus, this feel may be calibrated based on the particular vehicle application, and may also be calibrated for each shift type. For example, if the shift occurs immediately after the request, the driver may desire the extra inertia torque feel. If the shift occurs after several seconds to obtain better brake regeneration, the driver may not desire any torque feel as it would be delayed from the shift request.

The strategy may exit Mode 4 when the speed ratio of the transmission has achieved a desired value, e.g., 90% of the final value.

Mode 5: This is the end mode and provides the completion of the shift event. As known in the art, the controller may command the on-coming transmission clutch pressure to a maximum and the off-going transmission clutch pressure to a minimum, etc.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed:

1. A method comprising:
   by a controller,
      in response to a request to increase a powertrain braking force on a traction wheel,
         commanding at least one clutch of a transmission to increase a gear ratio of the transmission, and
         during stroking of the clutch, commanding an electric machine to act as a generator such that the electric machine applies a braking force to the traction wheel.

2. The method of claim 1 further comprising commanding the electric machine to act as a generator before commanding the at least one clutch to increase the gear ratio of the transmission.

3. The method of claim 1 further comprising, subsequent to stroking of the clutch, commanding the electric machine to act as a motor such that the electric machine applies a propulsion force to at least one of the traction wheels.

4. The method of claim 3 wherein the electric machine is commanded to act as a motor when a speed ratio of the transmission has achieved a first target value.

5. The method of claim 4 wherein the command to act as a motor is removed when the speed ratio of the transmission has achieved a second target value.

6. A hybrid electric vehicle comprising:
   a plurality of traction wheels;
   an engine;
   a transmission mechanically connected with the engine and including at least one clutch to alter a gear ratio of the transmission;
   an electric machine mechanically connected with at least one of the traction wheels; and
   a controller configured to, in response to a request to increase a powertrain braking force on at least one of the traction wheels, (i) command the at least one clutch to increase the gear ratio of the transmission and (ii) during stroking of the clutch, command the electric machine to act as a generator such that the electric machine applies a braking force to at least one of the traction wheels.

7. The vehicle of claim 6 wherein the controller is further configured to command the electric machine to act as a generator before commanding the at least one clutch to increase the gear ratio of the transmission.

8. The vehicle of claim 6 wherein the controller is further configured to, subsequent to stroking of the clutch, command the electric machine to act as a motor such that the electric machine applies a propulsion force to at least one of the traction wheels.

9. The vehicle of claim 8 wherein the controller is further configured to command the electric machine to act as a motor when a speed ratio of the transmission has achieved a first target value.

10. The vehicle of claim 9 wherein the command to act as a motor is removed when the speed ratio of the transmission has achieved a second target value.

11. The vehicle of claim 6 wherein the at least one traction wheel is a front traction wheel.

12. The vehicle of claim 6 wherein the at least one traction wheel is a rear traction wheel.

* * * * *